United States Patent
Pillay et al.

(10) Patent No.: US 7,522,214 B1
(45) Date of Patent: Apr. 21, 2009

(54) CIRCUITS AND METHODS FOR DEINTERLACING VIDEO DISPLAY DATA AND SYSTEMS USING THE SAME

(75) Inventors: Sanjay R. Pillay, Austin, TX (US); Brian F. Bounds, Dripping Springs, TX (US); William Lynn Gallagher, Austin, TX (US)

(73) Assignee: Magnum Semiconductor, Inc., Fremont, CA (US)

( * ) Notice: Subject to any disclaimer, the term of this patent is extended or adjusted under 35 U.S.C. 154(b) by 542 days.

(21) Appl. No.: 11/167,877

(22) Filed: Jun. 27, 2005

(51) Int. Cl.
*H04N 7/01* (2006.01)
*H04N 11/20* (2006.01)

(52) U.S. Cl. .................... 348/452; 348/441; 348/448

(58) Field of Classification Search .......... 348/448, 348/451–452, 441, 458–459, 620, 607, 624, 348/443, 559, 910, 700; *H04N 7/01, 11/20*
See application file for complete search history.

(56) References Cited

U.S. PATENT DOCUMENTS

| | | | |
|---|---|---|---|
| 5,339,109 A | 8/1994 | Hong | |
| 5,467,439 A | 11/1995 | Lee et al. | |
| 5,519,451 A | 5/1996 | Clatanoff et al. | |
| 5,532,751 A | 7/1996 | Lui | |
| 5,579,054 A * | 11/1996 | Sezan et al. | 348/452 |
| 5,602,654 A | 2/1997 | Patti et al. | |
| 5,708,474 A | 1/1998 | Hong | |
| 5,832,143 A | 11/1998 | Suga et al. | |
| 6,133,957 A | 10/2000 | Campbell | |
| 6,295,091 B1 | 9/2001 | Huang et al. | |
| 6,400,762 B2 | 6/2002 | Takeshima | |
| 6,459,455 B1 * | 10/2002 | Jiang et al. | 348/452 |
| 6,577,435 B1 | 6/2003 | Bang et al. | |
| 6,614,484 B1 | 9/2003 | Lim et al. | |
| 6,757,022 B2 | 6/2004 | Wredenhagen | |
| 6,795,123 B2 | 9/2004 | Gotanda et al. | |
| 7,206,028 B2 * | 4/2007 | Yeh et al. | 348/448 |
| 7,286,185 B2 * | 10/2007 | Wong et al. | 348/452 |
| 2005/0168655 A1 * | 8/2005 | Wyman et al. | 348/700 |

\* cited by examiner

*Primary Examiner*—Trang U Tran
(74) *Attorney, Agent, or Firm*—James J. Murphy; Thompson & Knight LLP

(57) ABSTRACT

A method of adaptive deinterlacing of video data includes generating a selected pixel value at a given pixel position of a current interlaced field by either weaving a pixel value from another interlaced field, when no motion is detected at the pixel position, or by interpolating between other selected pixel values of the current field, when motion is detected at the pixel position. When the pixel value is generated by weaving, a test for feathering is performed. If feathering is detected, a further check is performed for motion at the pixel position over a selected number of preceding fields. In the absence of motion over the preceding fields, the weaved pixel value is utilized as the selected pixel value. If motion is detected over the preceding fields, interpolation is performed between selected pixel values of the current field to generate the selected pixel value.

20 Claims, 6 Drawing Sheets

CIRCUITS AND METHODS FOR DEINTERLACING VIDEO DISPLAY DATA AND SYSTEMS USING THE SAME

CROSS-REFERENCE TO RELATED APPLICATION

The following co-pending and co-assigned applications contain related information and are hereby incorporated by reference:

Ser. No. 11/167,756 by Pillay, Bounds and Gallagher entitled CIRCUITS AND METHODS FOR DETECTING 2:2 ENCODED VIDEO AND SYSTEMS UTILIZING THE SAME, filed Jun. 27, 2005; and Ser. No. 11/167,682 by Pillay, Bounds and Gallagher entitled SYSTEMS AND METHODS FOR DETECTING A CHANGE IN A SEQUENCE OF INTERLACED DATA FIELDS GENERATED FROM A PROGRESSIVE SCAN SOURCE, filed Jun. 27, 2005.

FIELD OF INVENTION

The present invention relates in general to video processing techniques, and in particular, to circuitry and methods for deinterlacing video display data and systems using the same.

BACKGROUND OF INVENTION

Two primary video format standards are utilized worldwide to record, transmit, and display composite video data, namely, the National Television Systems Committee (NTSC) and the Phase Alternating Line (PAL) standards. Both the NTSC and PAL standards define interlaced video systems in which one frame of display pixels is partitioned into alternating interlaced fields, with each interlaced field updated at twice the update rate of the frame. Additionally, many digital versatile disk (DVD) players, DVD player-recorders, and similar video recording and playback systems, output data in an interlaced format, depending on the format utilized during recording.

On the other hand, many state of the art display systems, such as high definition television (HDTV) sets, generate displays using a progressive scan format. In the progressive scan format, video data are transmitted and displayed in frames, which are not partitioned into fields. In other words, each display frame is generated by sequentially scanning through the lines of each frame at the original interlaced field update rate.

Hence, in order to interface an interlaced video source, such as an interlaced-output DVD player, with a progressive-scan display system, such as a HDTV set, deinterlacing must be performed. Several deinterlacing techniques exist for converting interlaced video into progressive scan video; however, each has significant drawbacks. For example, in the weaving technique, the lines of the current field are merged with the lines of the previous field to weave a full frame. The resulting frames are generated at the full update rate. Weaving, however, often creates feathering, which is similar to ghosting-like un-sharpness of moving display objects. In the bob technique, each field is converted to a full frame by interpolating between the available lines of that same field to generate the missing pixel lines. The interpolated frames are then displayed at the field update rate. The bob technique, however, often misses information representing high frequency movement. Motion compensated deinterlacing systems are also available which compensate for un-sharpness due to motion, but these systems are normally difficult and expensive to implement and are therefore mostly limited to high-end applications.

Given increasing popularity of progressive scan display systems, as well as the need to maintain compatibility with systems generating interlaced display data, new deinterlacing techniques are required. These techniques should minimize the generation of display artifacts, such as feathering, while at the same time being easier and less expensive to implement those existing techniques.

SUMMARY OF INVENTION

The principles of the present invention are embodied in methods for deinterlacing video data during the conversion of fields of interlaced video data into frames of progressive scan video data. One particular embodiment of these principles is a method of adaptive deinterlacing of video data that includes generating a selected pixel value corresponding to a pixel position along a first pixel line of a first parity between second and third pixel lines of a second parity of a current interlaced field. A test is performed for motion at the pixel position. In response to detecting motion at the pixel position, the selected pixel value is generated by interpolating between pixel values corresponding to selected pixel positions of the second and third pixel lines of the current field. In response to detecting an absence of motion at the pixel position, a pixel value of a corresponding pixel position of a corresponding line of the selected parity of a temporally following field is weaved into the pixel position. A test for feathering at the pixel position after weaving is performed. In response to detecting feathering at the pixel position after weaving, a check is preformed for motion at the pixel position over a selected number of preceding fields. In response to detecting an absence of motion over the preceding fields, the weaved pixel value is utilized as the selected pixel value; and, in response to detecting value motion over the preceding fields, interpolation is performed between pixel values corresponding to pixel positions of the second and third pixel lines of the current field to generate the selected pixel value.

Embodiments of the present principles advantageous support the efficient generation of frames of progressive scan video data from fields of interlaced video data with the creation of a minimal number of artifacts. In particular, these embodiments efficiently minimize the effects of feathering in the progressive scan frames, while at the same time, minimizing false detection during deinterlacing of areas of feathering due to spatial high frequency. Furthermore, the embodiments of the present invention are relatively inexpensive to implement, in either hardware or software, in video devices and systems.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
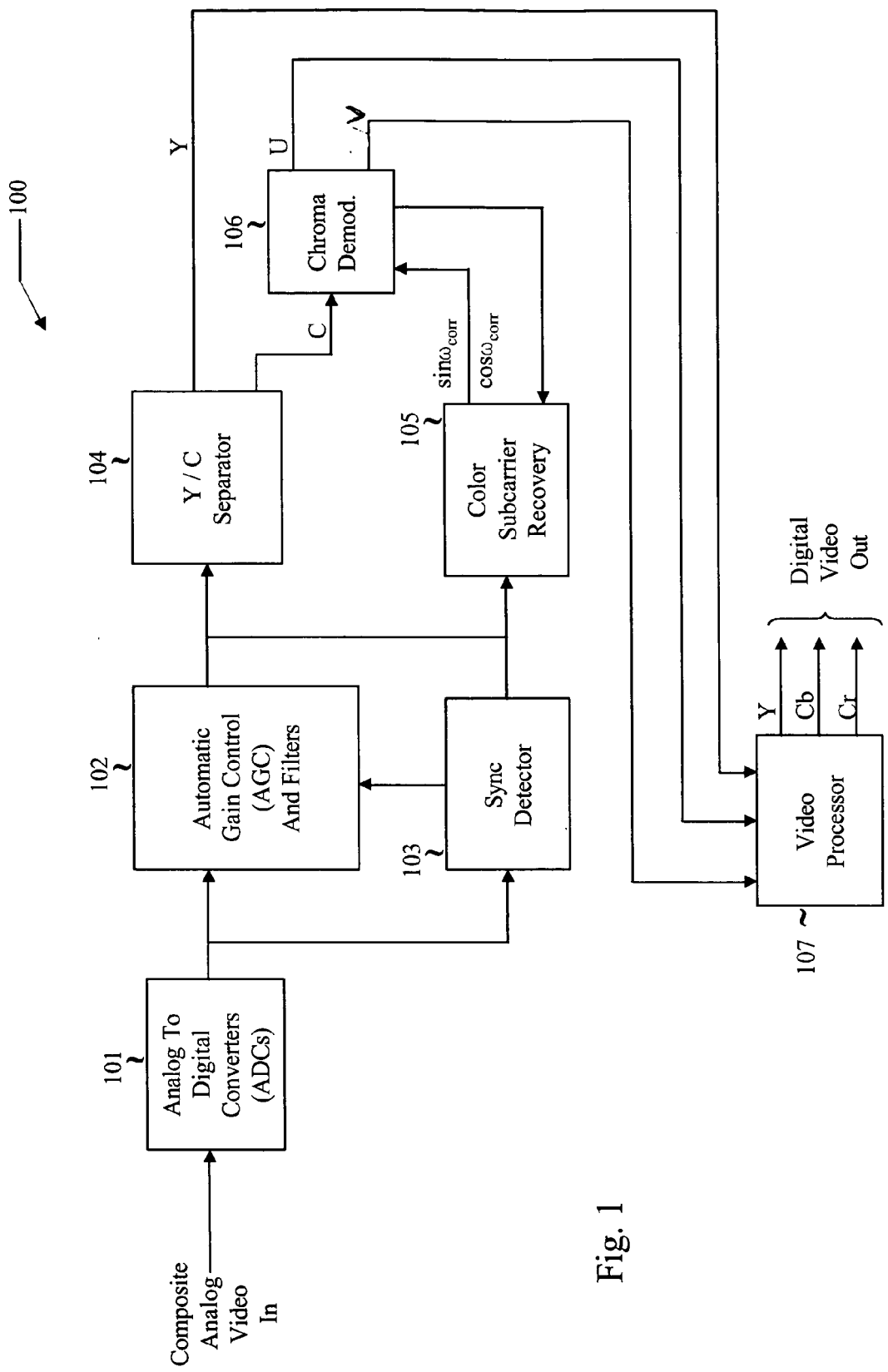
FIG. 1 is a high level block diagram of a representative audio-video system suitable for demonstrating the principles of the present invention.
Figure 2:
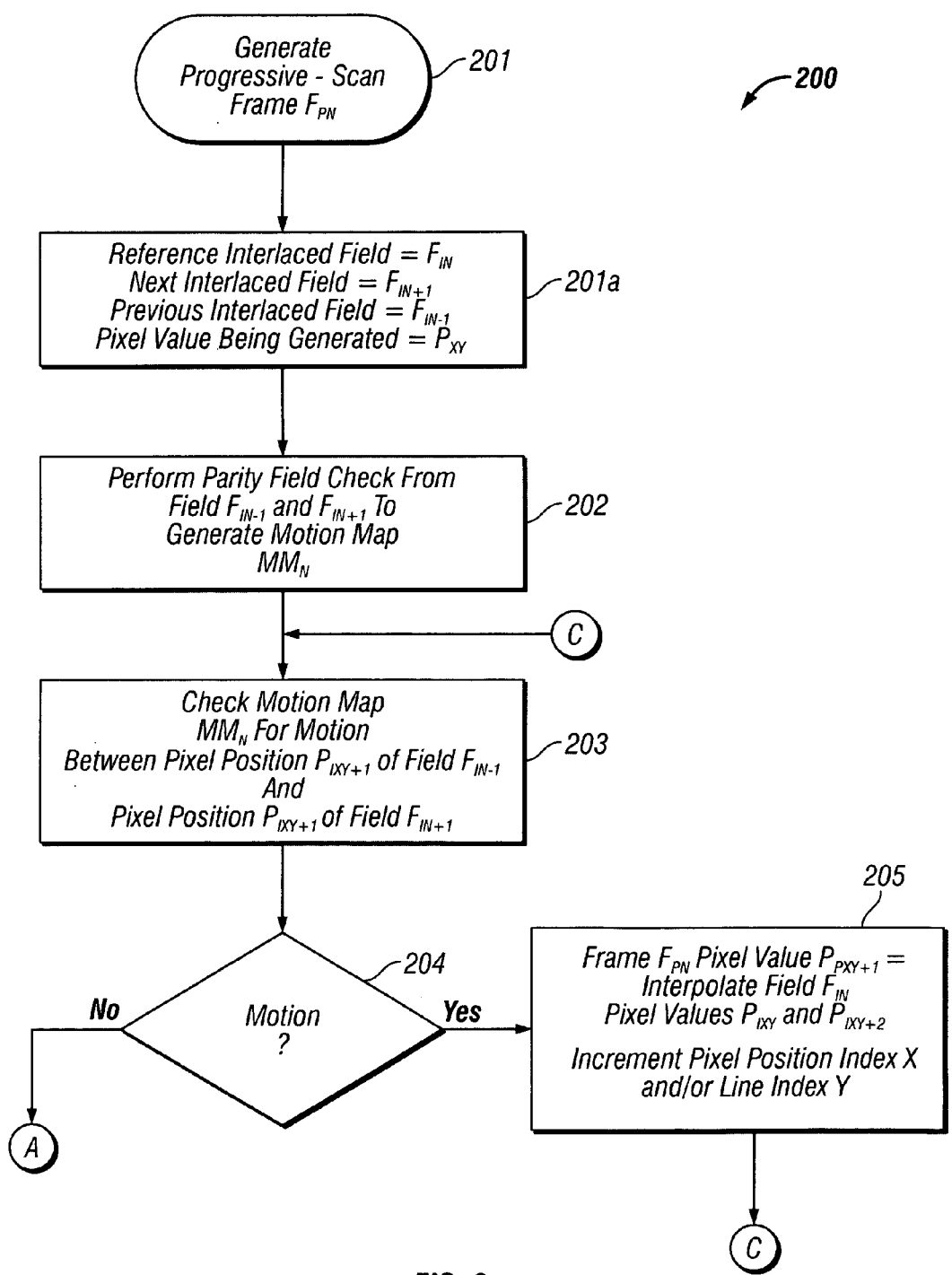
FIG. 2 is a flow chart of an exemplary deinterlacing procedure embodying the principles of the present invention.
Figure 2:
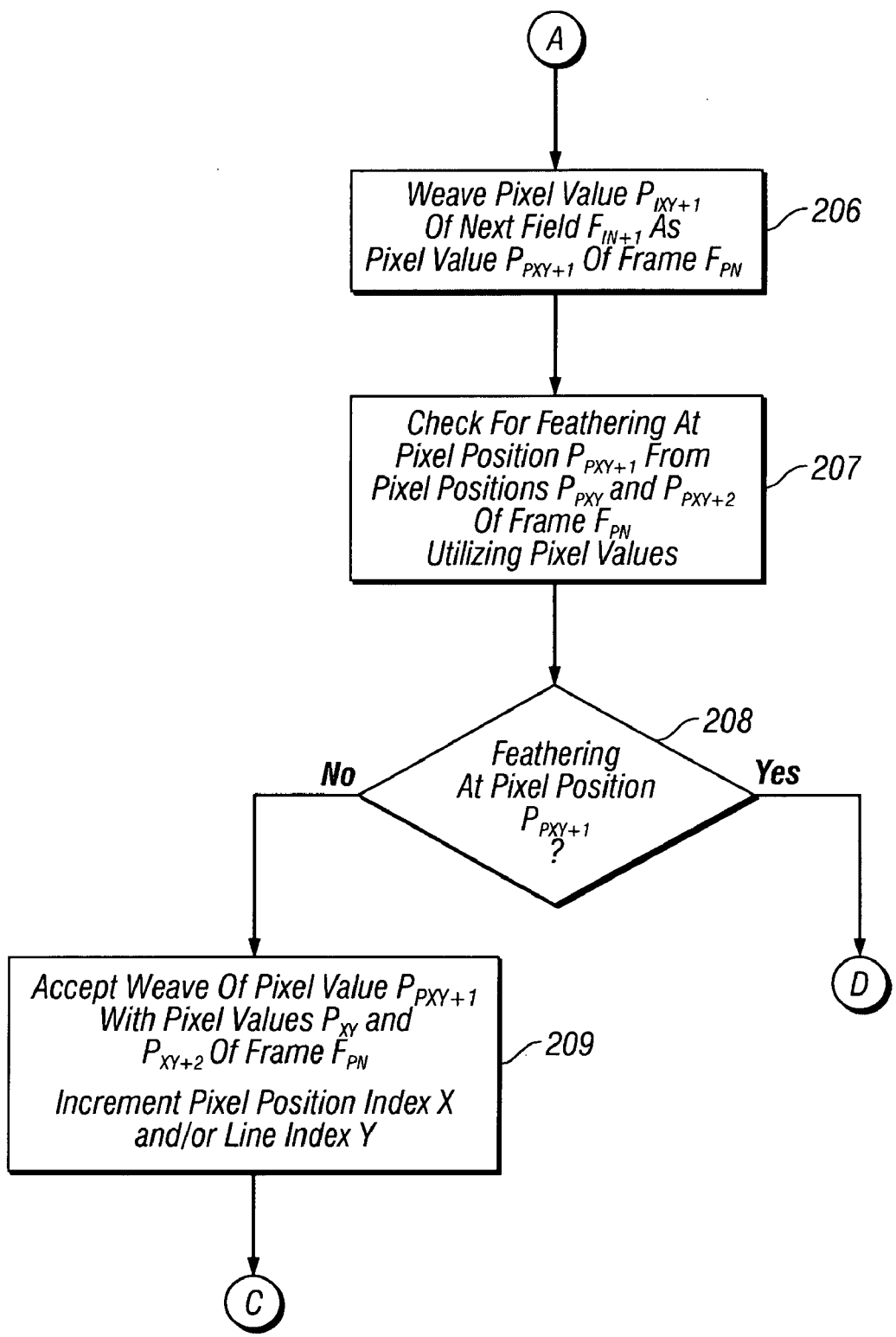
Figure 2:
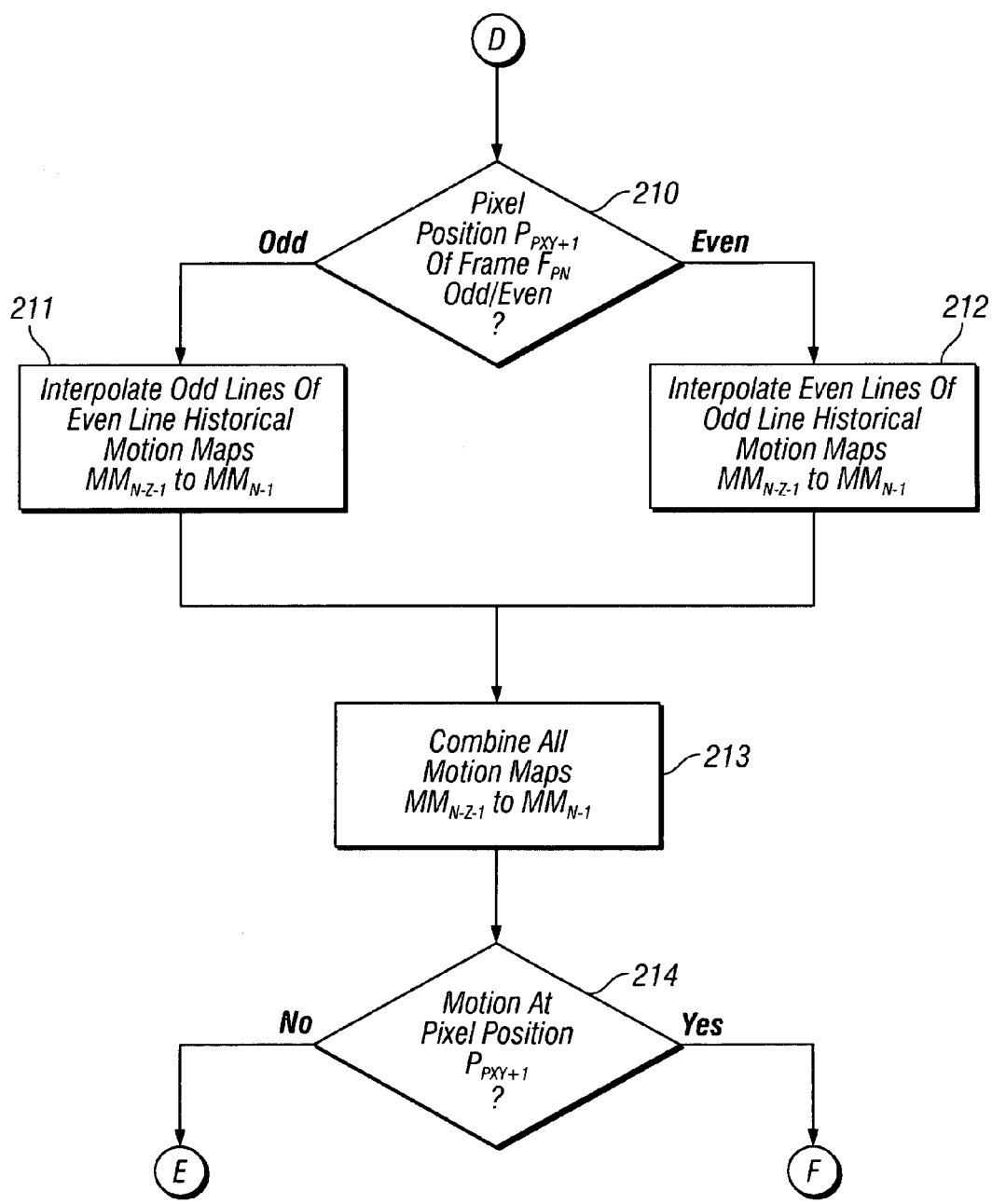
Figure 2:
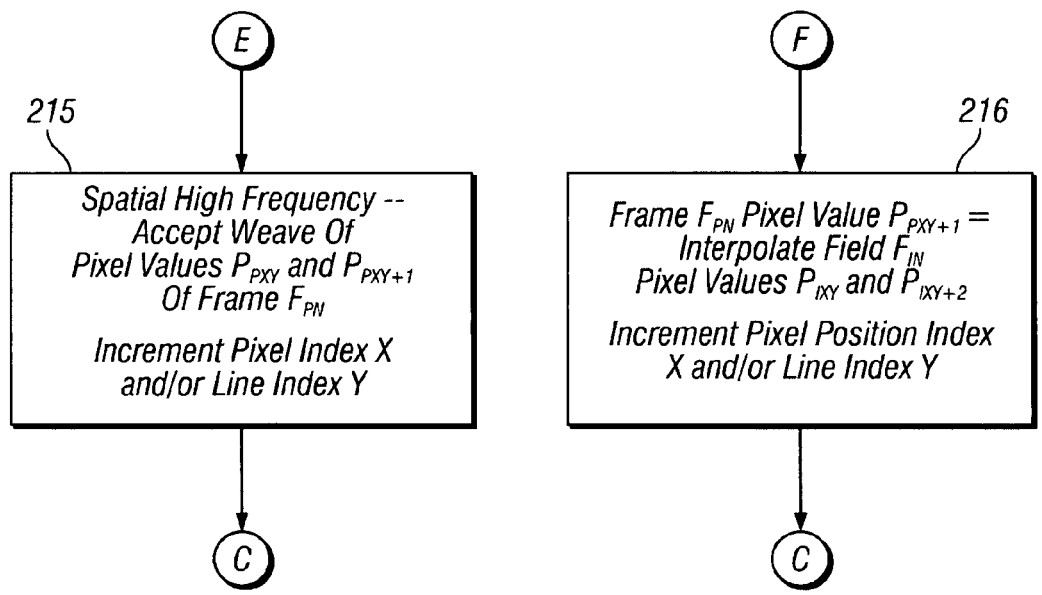

The principles of the present invention and their advantages are best understood by referring to the illustrated embodiment depicted in FIGS. 1-3 of the drawings, in which like numbers designate like parts.

FIG. 1 is a diagram of an exemplary analog to digital video decoder 100 suitable for describing the principles of the present invention. In the illustrated embodiment, video encoder converts a composite analog video input signal, in the YC format, into digital video data in the YCrCb component video format, although the inventive principles are not necessarily limited thereto.

In video encoder 100, the composite analog input video is converted into composite digital video in the YC format by analog to digital converters (ADCs) 101. The digitized YC video data are then passed through automatic gain control (AGC) and filters block 102. A sync detector 103 detects the vertical synchronization (VSYNC) signal, which controls the timing of the playback of each display field, and the horizontal synchronization signal (HSYNC), which controls the timing of the playback of each display line.

Y/C separator block 104 next separates the digital Y and C components of the digitized composite video data stream. The C component is demodulated into U and V color components by color subcarrier recovery block 105 and chroma demodulation block 106, described in further detail below. The Y, U, and V components are passed directly to video processor 107 for further processing to generate a YCrCb digital component video signal.

In the illustrated embodiment of audio-video recording and playback system 100, interlaced video to progressive scan video conversion (deinterlacing) is performed within video processor 107. In alternate embodiments, deinterlacing may be performed in a dedicated post-processor, which may be located within audio-video recording and playback system 100 or within an associated display system, such as a high definition television (HDTV).

FIG. 2 is a flow chart illustrating a representative method 200 for generating a sequence of frames of progressive scan video data from a sequence of fields of interlaced video data. For discussion purposes, FIGS. 3A and 3B are respectively conceptual diagrams of small sections of interlaced and progressive scan displays.

Figure 3A:
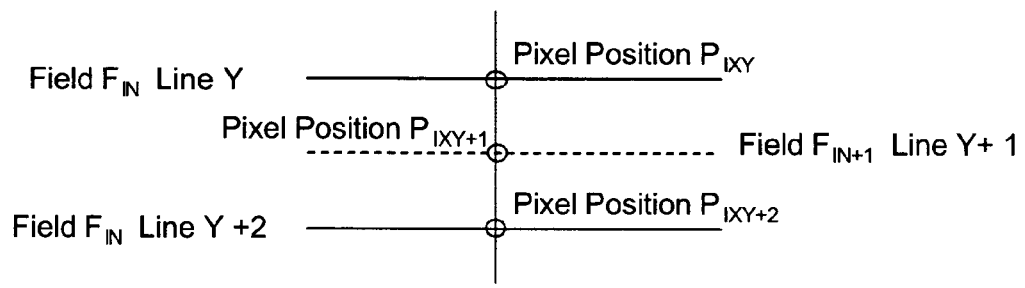
FIGS. 3A and 3B are conceptual diagrams of respective small sections of deinterlaced and progressive scan displays suitable for describing the exemplary nomenclature utilized in the flow chart of FIG. 2.
Figure 3B:
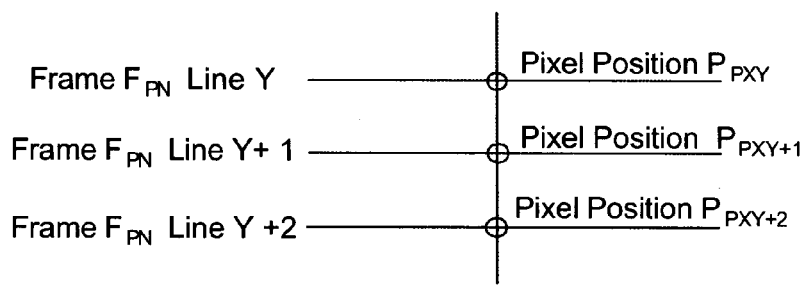

In the example shown in FIGS. 2, and 3A-3B, the current interlaced field is field $F_{IN}$, in which N is an integer and may be odd or even. In particular, as shown in FIG. 3A, the current line of current field $F_{IN}$ is line Y, wherein Y is also an integer, and the spatially following line of current field $F_{IN}$ is line Y+2. The temporally following interlaced field is field $F_{IN+1}$ and provides vertically adjacent line Y+1 when fields $F_{IN}$ and $F_{IN+1}$ are interlaced in a typical interlaced display system. Representative vertically aligned interlaced pixel are pixels $P_{IXY}$ and $P_{IXY+2}$ of the current field and pixel $P_{IXY+1}$ of the temporally following field $F_{IN+1}$, in which X is an integer representing the pixel position along lines Y, Y+1, and Y+2. Display pixel positions $P_{IXY}$ and $P_{IXY+2}$ f the current field and pixel position $P_{IXY+1}$ are represented by corresponding pixel values $P_{IXY}$, $P_{IXY+2}$ and $P_{IXY+1}$, including, for example luminance and chrominance values.

As shown in FIG. 3B, each progressive scan frame is designated $F_{PN}$, in which N is an integer. In the progressive scan frame $F_{PN}$, representative vertically adjacent pixels of three lines Y, Y+1, and Y+2, are designated $P_{PY}$ and $P_{PY+1}$, and $P_{PY+2}$. Pixel positions $P_{PXY}$ and $P_{PXY+1}$, and $P_{PXY+2}$ are represented by corresponding pixel values $P_{PXY}$ and $P_{PXY+1}$, and $P_{PXY+2}$, including, for example, luminance and chrominance values.

For discussion purposes, procedure 200 will be described by assuming interlaced field $F_{IN}$ is the reference field such that pixel lines Y and Y+2 of current interlaced field $F_{IN}$ provide lines Y and Y+2 of progressive scan frame $F_{PN}$. In this example, line Y+1, of progressive scan frame $F_{PN}$, and in particular pixel $P_{PXY+1}$, is being generated during the current iteration of procedure 200.

At block 201a, the reference interlaced field is set as field $F_{IN}$, the temporally preceding interlaced field becomes field $F_{IN-1}$, and the temporally following interlaced field becomes field $F_{IN+1}$. Thus, for example if reference field $F_{IN}$ has even parity (i.e. is composed of even numbered pixel lines), then preceding field $F_{IN-1}$ and following field $F_{IN+1}$ both have odd parity (i.e. are composed of odd numbered pixel lines). On the other hand, if reference field $F_{IN}$ has odd parity, then preceding field $F_{IN-1}$ and following field $F_{IN+1}$ are both of even parity.

A motion map $MM_N$ is generated at block 202 by comparing the chrominance and luminance data of each pixel value of preceding field $F_{IN-1}$ against both a threshold value and the luminance and chrominance data of the corresponding pixel value of following field $F_{IN+1}$. In the illustrated embodiment, for a given one of the luminance and chrominance values of each pixel value, motion at the corresponding pixel position is detected when the absolute value of the difference between the corresponding pixel values in fields $F_{IN-1}$ and $F_{IN+1}$ is greater than the selected threshold value. The resulting motion map $MM_N$ is preferably a one (1) bit per pixel map, with the bit mapping to a given pixel position set to a logic one (1) to indicate a change in luminance, chrominance, or both luminance and chrominance of the corresponding pixel value between fields $F_{IN-1}$ and $F_{IN+1}$ (i.e. motion detected) or to a logic zero (0) to indicate no change in either luminance or chrominance of that pixel value between fields $F_{IN-1}$ and $F_{IN+1}$ (i.e. no motion detected). As discussed further below, motion maps generated at block 202 have lines of bits of either an odd or even parity, depending on the parity of the lines of the preceding and following fields being compared by parity check. In particular, if interlaced fields $F_{IN-1}$ and $F_{IN+1}$ are odd, the lines of motion $MM_N$ map represent odd pixel lines, and if interlaced fields $F_{IN-1}$ and $F_{IN+1}$ are even, the lines of motion map $MM_N$ represent even pixel lines.

For the generation of exemplary pixel value $P_{PXY+1}$ corresponding to display pixel position $P_{PXY+1}$, the corresponding bit in motion map $MM_N$ is checked at block 203 for motion between pixel values $P_{IXY+1}$ corresponding to display pixel position $P_{IXY+1}$ of preceding field $F_{IN-1}$ and following field $F_{IN+1}$. In other words, a check for motion is made between the pixel value for the same pixel position along the corresponding line of the temporally prior field of the same parity as the bit being generated and the pixel value for the same pixel position along the corresponding line of the next temporal field of the same parity as the bit being generated.

If motion is detected at decision block 204, then at block 205, pixel value $P_{PXY+1}$ of progressive scan frame $F_{PN}$ is generated by interpolating between pixel values of the current field, for example, between pixel values $P_{IXY}$ and $P_{IXY+2}$ corresponding to vertically aligned pixel positions $P_{IXY}$ and $P_{IXY+2}$ of reference field $F_{IN}$. In other words, in the present example, the current pixel value is generated by interpolating from the vertically adjacent pixel values of the line above and the line below the line being generated in the progressive scan frame. In alternative embodiments, other pixel values in the neighborhood of pixel value $P_{PXY+1}$ may be utilized in the interpolation operation. After interpolation at block 205, the pixel index X is incremented, and if the end of the current line has been reached, the line index Y is incremented, and procedure 200 loops-back to block 203 to initiate the generation of the next pixel value corresponding to the next pixel position in progressive scan frame $F_{PN}$.

On the other hand, if no motion is detected at decision block 204, then at block 206, pixel value $P_{PXY+1}$ of progressive scan frame $F_{PN}$ is generated by weaving in the corresponding pixel value $P_{IXY+1}$ of temporally preceding field $F_{IN+1}$. In other words, the current pixel value being generated is taken from the corresponding pixel value and line of the next interlaced field of the same parity as the progressive scan line being generated.

After weaving is performed at block 206, a check is made at block 207 for feathering at pixel position $P_{PXY+1}$ of progressive scan frame $F_{PN}$. Feathering is checked by comparing the characteristics of corresponding pixel value $P_{PXY+1}$ with the characteristics of the pixel values $P_{PXY}$ and $P_{PXY+2}$ corresponding to vertically adjacent pixel positions $P_{PXY}$ and $P_{PXY+2}$ of progressive scan frame $F_{PN}$. Specifically, the luminance and chrominance of pixel value $P_{PXY+1}$ are compared against the luminance and chrominance of pixel values $P_{PXY}$ and $P_{PXY+2}$ after weaving. If the luminance, chrominance, or both luminance and chrominance of weaved pixel value $P_{PXY+1}$ deviates by a threshold amount from that of both pixel values $P_{PXY}$ and $P_{PXY+2}$, a check for feathering is required because the single motion map parity check at block 203 can miss motion which occurs during the time between the generation of preceding field $F_{IN-1}$ and following field $F_{IN+1}$. On the other hand, feathering could be a representation of vertical spatial high frequency. Advantageously, one of the principles of the present invention allows for an accurate determination if any detected feathering represents actual motion or vertical spatial high frequency.

At decision block 208, feathering is detected when the magnitude of any change, in at least one of the luminance or chrominance values, between pixel value $P_{PXY+1}$ and both pixel values $P_{PXY}$ and $P_{PXY+2}$ exceeds a selected threshold, and the direction of change between pixel value $P_{PXY}$ and pixel value $P_{PXY+1}$ and the direction of change between pixel value $P_{PXY+1}$ and pixel value $P_{PXY+2}$ is the same. Otherwise, if any of these three conditions is not met, an absence of motion is detected at pixel position $P_{PXY+1}$.

If no feathering is detected, the weave performed at block 206 is accepted at block 209, and procedure 200 moves to the generation of the next pixel value corresponding to the next pixel position in progressive scan frame $F_{PN}$. In other words, the weaved pixel value $P_{PXY+1}$ is utilized in the corresponding pixel position in progressive scan frame $F_{PN}$.

In contrast, if feathering is detected at decision block 208, then historical value motion detection must be performed to determine if the feathering is the result of actual motion or the result of vertical spatial high frequency. Vertical spatial high frequency occurs when pixel values rapidly change because of sharp spatial changes in the display objects being generated, such as at the boundaries checker-board patterns or with fine resolution pixel patterns, such as fine display vertical object lines.

To detect historical motion at pixel position $P_{PXY+1}$, motion maps $MM_{N-Z-1}$ to $MM_{N-1}$, which were created at block 203 during the generation of Z number of temporally preceding progressive frames $F_{IN-Z-1}$ to $F_{IN-1}$, are combined into a single motion map (current motion map $MM_N$ is not included) in which Z is an integer, preferably less than ten (10). Specifically, a determination is made at decision block 210 as to the parity of the line of pixel position $P_{PXY+1}$ of the current pixel value $P_{PXY+1}$ being generated. If the line including pixel position $P_{PXY+1}$ has odd parity, then the odd map lines of even-line motion maps $MM_{N-Z-1}$ to $MM_{N-1}$ are generated by interpolation of the existing even motion map lines at block 211. If the line including pixel position $P_{PXY+1}$ has even parity, then the even map lines of odd-line motion maps $MM_{N-Z-1}$ to $MM_{N-1}$ are generated by interpolation of the existing odd motion map lines at block 212.

The interpolation operations performed at blocks 211 and 212 ensure that all Z number of motion maps $MM_{N-Z-1}$ to $MM_{N-1}$ have map lines of the same parity and therefore can be appropriately combined at block 213. Combination of memory maps $MM_{N-Z-1}$ to $MM_{N-1}$, is preferably accomplished by performing a logical-OR operation on a mapping-bit by mapping-bit basis. Consequently, at decision block 214, a determination can be made as to whether, over a history of the generation of Z number of previous progressive scan frames, motion has occurred at pixel position $P_{PXY+1}$.

If historical motion has not occurred at decision block 214, then at block 215, pixel value $P_{PXY+1}$ corresponding to pixel position $P_{PXY+1}$ is considered static in value (i.e. represents vertical spatial high frequency) and the weaving performed at block 206 is accepted for the generation of progressive scan frame $F_{PN}$ (i.e. weaved pixel value $P_{PXY+1}$ is utilized in progressive scan frame $F_{PN}$ at pixel position $P_{PXY+1}$). If, instead, motion is detected at decision block 214, then at block 216, pixel value $P_{PXY+1}$1 for pixel position $P_{PXY+1}$ of progressive scan frame $F_{PN}$ is generated by interpolating between pixel values of current field $F_{IN}$, such as pixel values $P_{IXY}$ and $P_{IXY+1}$ corresponding to vertically aligned pixel positions $P_{IXY}$ and $P_{IXY+1}$ of reference field $F_{IN}$. After completion of the operations at blocks 215 and 216, procedure 200 returns to block 203 to generate the next progressive scan pixel, after incrementation of pixel index X and/or line index Y Advantageously, the frames of progressive scan video data are generated from fields of interlaced video with minimal artifacts, such as feathering, while at the same time, the probability of falsely detecting artifacts due to spatial high frequency is minimized.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A method of adaptive deinterlacing of video data comprising:
   generating a selected pixel value corresponding to a pixel position along a first pixel line of a first parity between second and third pixel lines of a second parity of a current interlaced field comprising:
   testing for motion at the pixel position;
   in response to detecting motion at the pixel position, generating the selected pixel value by interpolating between pixel values corresponding to selected pixel positions of the second and third pixel lines of the current field;

in response to detecting an absence of motion at the pixel position, weaving a pixel value of a corresponding pixel position of a corresponding line of the selected parity of a temporally following field into the pixel position;

testing for feathering at the pixel position after weaving;

in response to detecting feathering at the pixel position after weaving, checking for motion at the pixel position over a selected number of preceding fields;

in response to detecting an absence of motion over the preceding fields, utilizing the weaved pixel value as the selected pixel value; and in response to detecting value motion over the preceding fields, interpolating between pixel values corresponding to pixel positions of the second and third pixel lines of the current field to generate the selected pixel value.

2. The method of claim 1, wherein the second pixel line is immediately above the first pixel line and the third pixel line is immediately below the first pixel line in a progressive scan display.

3. The method of claim 1, wherein testing for motion at the pixel position along the first pixel line comprises performing a parity check between pixel values corresponding to the selected pixel position of corresponding lines of the first parity of interlaced fields preceding and following the current interlaced field.

4. The method of claim 1, wherein testing for motion at the selected pixel position along the first pixel line comprises:

generating a motion map by performing a parity check between pixel values of pixel lines of the first parity of interlaced fields preceding and following the current interlaced field and setting a bit representing motion or an absence of motion between corresponding pixels of the interlaced fields preceding and following the current field; and checking the bit set in the motion map corresponding to the pixel position.

5. The method of claim 1, wherein testing for feathering comprises checking for changes in a selected one of luminance and chrominance values between the weaved pixel value and the pixel values of the second and third pixel lines.

6. The method of claim 1, wherein checking for motion at the pixel position over a selected number of preceding fields comprises:

generating a motion map for pairs of the preceding fields having pixel lines of the same parity; and checking the motion maps generated for each of the preceding fields for motion at the pixel position.

7. The method of claim 6, wherein generating a motion map for each of the preceding fields comprises:

for pairs of a preceding interlaced field having pixel lines of the second parity:

generating a motion map including bit values representing motion or an absence of motion at corresponding pixel positions of the pixel lines of the second parity; and interpolating between the bit values representing motion or an absence of motion at the corresponding pixel positions of the pixel lines of the second parity to generate other bit values representing motion or an absence of motion at corresponding pixel positions of pixel lines of the first parity.

8. A method of generating a progressive scan video frame from fields of interlaced video comprising:

weaving a pixel value into a pixel position along a line of a first parity of a progressive scan frame, the pixel position disposed between pixels of a current interlaced field of lines of a second parity, the pixel value weaved from a temporally following interlaced field of lines of the first parity;

detecting feathering at the pixel position after weaving;

checking whether the detected feathering represents historical motion at the pixel position over a selected number of temporally preceding interlaced fields;

in response to detecting an absence of historical motion at the pixel position, utilizing the weaved pixel value from the temporally following field as the pixel at the pixel position of the progressive scan frame; and in response to detecting historical motion at the pixel position, interpolating between the pixel values of the current interlaced field to generate the pixel value at the pixel position of the progressive scan frame.

9. The method of claim 8, further comprising:

detecting an absence of feathering at the pixel position after weaving; and in response to detecting an absence of feathering at the pixel position after weaving, utilizing the weaved pixel value from the temporally following field as the pixel at the pixel position of the progressive scan frame.

10. The method of claim 8, wherein checking whether the detected feathering represents historical motion at the pixel position over a selected number of temporally preceding interlaced fields comprises:

generating a motion map for pairs of the preceding fields of the same parity; and combining the motion maps generated; and checking a combined motion map for motion at the pixel position.

11. The method of claim 10, wherein combining the motion maps comprises performing a logical-OR operation on corresponding bits of the motion maps, each bit representing motion or an absence of motion between corresponding pixel values of the temporally preceding fields.

12. The method of claim 11, further comprising:

for pairs of temporally preceding fields having pixel lines of the second parity:

generating a motion map including bits representing motion or an absence of motion at pixel positions of the pixel lines of the second parity; and interpolating between the bits representing motion or an absence of motion at the pixel positions of the pixel lines of the second parity to generate bits representing motion or an absence of motion at pixel values of pixel lines of the first parity.

13. The method of claim 8, further comprising:

prior to weaving a pixel into the pixel position:

testing for motion at the pixel position between pixel values corresponding to pixel positions of temporally preceding and following fields of lines of the first parity;

in response to detecting motion at the pixel position, interpolating between corresponding pixel values of the current interlaced field of lines of a second parity to generate another pixel value for the pixel position in the progressive scan frame; and in response to detecting an absence of value motion at the pixel position, performing the weaving.

14. Adaptive deinterlacing system operable to:

generate a pixel value corresponding to a selected pixel position along a first pixel line of a first panty between second and third pixel lines of a current interlaced field of a second parity;

test for motion at the selected pixel position;

in response to detecting motion at the selected pixel position, generate the selected pixel value by interpolating between the second and third pixel lines;

in response to detecting an absence of motion at the selected pixel position, weave a pixel from a corresponding pixel position of a corresponding line of the first parity of a temporally following field into the pixel position;

test for feathering at the pixel position after weaving;

in response to detecting feathering at the pixel position after weaving, check for motion at the pixel position over a selected number of preceding fields in response to detecting an absence of motion over the preceding fields, utilize the weaved pixel as the selected pixel; and in response to detecting motion over the preceding fields, interpolate between selected pixel values corresponding to selected pixel positions of the second and third pixel lines to generate the selected pixel value.

15. The adaptive deinterlacing system of claim 14, embodied in deinterlacing circuitry forming a portion of a video processing system.

16. The adaptive deinterlacing system of claim 1, wherein at least a portion of the adaptive deinterlacing system is embodied in software.

17. The adaptive deinterlacing system of claim 15, wherein the video processing system comprises a single-chip video processing system including the deinterlacing circuitry.

18. The adaptive deinterlacing system of claim 15, wherein the adaptive deinterlacing system is operable to test for feathering by checking for changes in a selected one of luminance and chrominance values between the weaved pixel value and the pixel values corresponding to selected pixels of the second and third pixel lines.

19. The adaptive deinterlacing system of claim 15, wherein the adaptive deinterlacing system is operable to check for motion at the pixel position over a selected number of preceding fields by:

generating a motion map for pairs of the preceding fields having pixel lines of the same parity; and checking the motion maps generated for each of the preceding fields for motion at the pixel position.

20. The adaptive deinterlacing system of claim 19, wherein the adaptive deinterlacing system is operable to generate a motion map for each of the preceding fields by:

for pairs of preceding interlaced field having pixel lines of the second parity:

generating a motion map including bits representing motion or an absence of motion at pixel positions of the pixel lines of the second parity; and interpolating between the bits representing motion or an absence of motion at the pixel positions of the pixel lines of the second parity to generate bits representing motion or an absence of motion for pixel positions of pixel lines of the first parity.

\* \* \* \* \*